(12) United States Patent
Shemesh et al.

(10) Patent No.: US 10,142,306 B1
(45) Date of Patent: Nov. 27, 2018

(54) METHODS FOR PROVIDING A SECURE NETWORK CHANNEL AND DEVICES THEREOF

(71) Applicant: F5 Networks, Inc., Seattle, WA (US)

(72) Inventors: Yaniv Shemesh, Sammanish, WA (US); David Stav, Mountain View, CA (US)

(73) Assignee: F5 Networks, Inc., Seattle, WA (US)

( * ) Notice: Subject to any disclaimer, the term of this patent is extended or adjusted under 35 U.S.C. 154(b) by 24 days.

(21) Appl. No.: 15/147,573

(22) Filed: May 5, 2016

Related U.S. Application Data (60) Provisional application No. 62/157,280, filed on May 5, 2015.

(51) Int. Cl.
    *H04L 29/06*      (2006.01)
    *H04L 9/32*      (2006.01)
    *H04L 9/14*      (2006.01)
    *H04L 29/12*      (2006.01)

(52) U.S. Cl.
CPC ........ *H04L 63/062* (2013.01); *H04L 63/0876* (2013.01); *H04L 9/14* (2013.01); *H04L 9/321* (2013.01); *H04L 61/35* (2013.01); *H04L 63/0428* (2013.01); *H04L 67/42* (2013.01); *H04L 2463/121* (2013.01)

(58) Field of Classification Search
None
See application file for complete search history.

(56) References Cited

U.S. PATENT DOCUMENTS

| 6,748,056 B1 * | 6/2004 | Capriotti | H04L 51/066 |
| | | | 379/88.17 |
| 7,228,412 B2 | 6/2007 | Freed | |
| 7,519,834 B1 * | 4/2009 | Dondeti | H04L 63/065 |
| | | | 713/190 |
| 9,077,709 B1 | 7/2015 | Dall | |
| 2002/0116615 A1 * | 8/2002 | Nguyen | G06F 21/10 |
| | | | 713/168 |
| 2004/0103283 A1 | 5/2004 | Hornak | |

(Continued)

OTHER PUBLICATIONS

BIG-IP® Analytics: Implementations, version 11.3, Nov. 15, 2012, F5 Networks, Inc., pp. 1-40.

(Continued)

*Primary Examiner* — Benjamin E Lanier
(74) *Attorney, Agent, or Firm* — LeClairRyan PLLC (57) ABSTRACT

A method, non-transitory computer readable medium and device that assists providing a secure channel includes selecting a client-server key from a plurality of client-server keys based on an IP address of a client computing device and a time of receiving a request from the client computing device wherein the selecting further includes identifying an index value associated with the selected client-server key. Next, a context signature is generated based on the IP address of the client computing device, the time of receiving the request from the client computing device and the index value associated with the selected client-server key. Next, the generated context signature is encrypted using a stored private key. A secure channel is provided by preparing and sending a response including the selected client-server key and the encrypted context signature back to the client computing device.

16 Claims, 4 Drawing Sheets

(56) References Cited

U.S. PATENT DOCUMENTS

| | | | |
|---|---|---|---|
| 2005/0027846 A1* | 2/2005 | Wolfe | G06F 8/61 709/223 |
| 2008/0263215 A1 | 10/2008 | Schnellbaecher | |
| 2010/0325418 A1 | 12/2010 | Kanekar | |
| 2011/0154026 A1 | 6/2011 | Edstrom | |
| 2011/0264905 A1 | 10/2011 | Ovsiannikov | |
| 2014/0095865 A1 | 4/2014 | Yerra | |
| 2014/0298419 A1 | 10/2014 | Boubez | |
| 2015/0067328 A1* | 3/2015 | Yin | H04L 9/3236 713/168 |
| 2015/0271179 A1* | 9/2015 | Wang | H04L 63/10 726/30 |

OTHER PUBLICATIONS

F5 Networks, "BIG-IP Local Traffic Manager: Concepts", version 11.4, pp. 1-178, retrieved from https://support.f5.com/kb/en-us/products/big-ip_ltm/manuals/product/ltm-concepts-11-4-0.html on Feb. 12, 2015.

F5 Networks, "BIG-IP Local Traffic Manager: Implementations", version 11.4, pp. 1-234, retrieved from https://support.f5.com/kb/en-us/products/big-ip_ltm/manuals/product/ltm-implementations-11-4-0.html on Feb. 12, 2015.

F5 Networks, "BIG-IP Local Traffic Manager: Monitors Reference", version 11.4, pp. 1-106, retrieved from https://support.f5.com/kb/en-us/products/big-ip_ltm/manuals/product/ltm-monitors-reference-11-4-0.html on Feb. 12, 2015.

F5 Networks, "Operations Guide 1.0 F5 Local Traffic Manager and Global Traffic Manager", pp. 1.144, retrieved from https://support.f5.com/kb/en-us/products/big-ip_ltm/manuals/product/f5-ltm-gtm-operations-guide-1-0.html on Feb. 12, 2015.

F5 Networks, "Release Note: BIG-IP LTM and TMOS", version 11.4.1, pp. 1-58, retrieved from https://support.f5.com/kb/en-us/products/big-ip_ltm/releasenotes/product/relnote-ltm-11-4-1.html on Feb. 12, 2015.

F5 Networks, Inc., "BIG-IP Application Security Manager Operations Guide", Manual, Feb. 5, 2016, pp. 1-181, F5 Networks, Inc.

F5 Networks, Inc., "BIG-IP ASM 11.5.0", Release Notes, Apr. 12, 2016, Version 11.5.0.

F5 Networks, Inc., "BIG-IP ASM", Release Notes, Jun. 13, 2016, pp. 1-18, version 11.6.1 F5 Networks, Inc.

F5 Networks, Inc., "BIG-IP® Analytics: Implementations", Manual, Jan. 31, 2014, pp. 1-50, Version 11.5.

F5 Networks, Inc., "BIG-IP® Analytics: Implementations", Manual, Aug. 25, 2014, pp. 1-62, v11.6, F5 Networks, Inc.

F5 Networks, Inc., "BIG-IP® Application Security Manager™: Getting Started", Manual, Aug. 25, 2014, pp. 1-78, version 11.6, F5 Networks, Inc.

F5 Networks, Inc., "BIG-IP® Application Security Manager™: Implementations", Manual, Aug. 25, 2014, pp. 1-420, version 11.6, F5 Networks, Inc.

F5 Networks, Inc., "BIG-IP® Application Security Manager™: Implementations", Manual, Jan. 31, 2014, pp. 1-396, Version 11.5.

F5 Networks, Inc., "BIG-IP® Application Security Manager™: Implementations", F5 Networks, Inc., Dec. 10, 2014, version 11.6, pp. 1-420.

F5 Networks, Inc., "BIG-IP® Local Traffic Management: Basics", Manual, Aug. 25, 2014, pp. 1-74, version 11.6, F5 Networks, Inc.

F5 Networks, Inc., "BIG-IP® Network Firewall: Policies and Implementations", Manual, Aug. 10, 2016, pp. 1-166, v11.6, F5 Networks, Inc.

F5 Networks, Inc., "BIG-IP® Systems: DoS Protection and Protocol Firewall Implementations", Manual, Aug. 25, 2014, pp. 1-108, v11.6, F5 Networks, Inc.

F5 Networks, Inc., "BIG-IP® TMOS®: Concepts", Manual, Nov. 11, 2014, pp. 1-148, Version 11.5.

F5 Networks, Inc., "BIG-IP® TMOS®: Implementations", Manual, Jan. 31, 2014, pp. 1-274, Version 11.5.

F5 Networks, Inc., "F5 BIG-IP TMOS: Operations Guide", Manual, Mar. 5, 2015, pp. 1-276 version 11.6, F5 Networks, Inc.

* cited by examiner

METHODS FOR PROVIDING A SECURE NETWORK CHANNEL AND DEVICES THEREOF

This application claims the benefit of U.S. Provisional Patent Application Ser. No. 62/157,280, filed May 5, 2015, which is hereby incorporated by reference in its entirety.

FIELD

This technology generally relates to methods and devices for network traffic management and, more particularly, to methods for providing a secure network channel and devices thereof.

BACKGROUND

Web applications provide end users with client access to server functionality through a set of Web pages. These pages often contain JavaScript code to be executed dynamically within the client web browser. However, Web applications, such as web browsers, are subject to attacks, such as cross-site scripting, or cookie theft, among many others.

Of the current attacks on web applications, script injection based attacks are by far the most common. Script injection vulnerability may be present whenever a web application includes data of uncertain origin. In a typical attack, malicious data with surreptitiously embedded scripts is included in requests to a benign web application server. Later, the server may include that data and scripts in web pages it returns to unsuspecting users. Since web browsers execute scripts on a page with web application, these returned scripts can give attackers control over the user's web application activities and/or client devices and initiate distributed denial of service attacks on the web servers.

SUMMARY

A method for providing a secure network channel includes selecting by an application manager apparatus a client-server key from a plurality of client-server keys based on an IP address of a client computing device and a time of receiving a request from the client computing device wherein the selecting further includes identifying an index value associated with the selected client-server key. Next, a context signature is generated by the application manager apparatus based on the IP address of the client computing device, the time of receiving the request from the client computing device and the index value associated with the selected client-server key. Next, the generated context signature is encrypted by the application manager apparatus using a stored private key. A secure channel is provided by the application manager apparatus by preparing and sending a response including the selected client-server key and the encrypted context signature back to the client computing device.

A non-transitory computer readable medium having stored thereon instructions for providing a secure network channel comprising machine executable code which when executed by at least one processor, causes the processor to perform steps includes selecting a client-server key from a plurality of client-server keys based on an IP address of a client computing device and a time of receiving a request from the client computing device wherein the selecting further includes identifying an index value associated with the selected client-server key. Next, a context signature is generated based on the IP address of the client computing device, the time of receiving the request from the client computing device and the index value associated with the selected client-server key. Next, the generated context signature is encrypted using a stored private key. A secure channel is provided by preparing and sending a response including the selected client-server key and the encrypted context signature back to the client computing device.

An application manager apparatus including one or more processors coupled to a memory and configured to be capable of executing programmed instructions comprising and stored in the memory to select a client-server key from a plurality of client-server keys based on an IP address of a client computing device and a time of receiving a request from the client computing device wherein the selecting further includes identifying an index value associated with the selected client-server key. Next, a context signature is generated based on the IP address of the client computing device, the time of receiving the request from the client computing device and the index value associated with the selected client-server key. Next, the generated context signature is encrypted using a stored private key. A secure channel is provided by preparing and sending a response including the selected client-server key and the encrypted context signature back to the client computing device.

This technology provides a number of advantages including providing a method, non-transitory computer readable medium and apparatus that effectively assists with providing a secure network channel. Using the claimed technology, the client computing devices cannot decrypt the encrypted context signature using the selected client-server key and therefore an unauthorized user, such as a hacker using the client computing devices, cannot modify the contents of the encrypted context signature.

DETAILED DESCRIPTION

Figure 1:
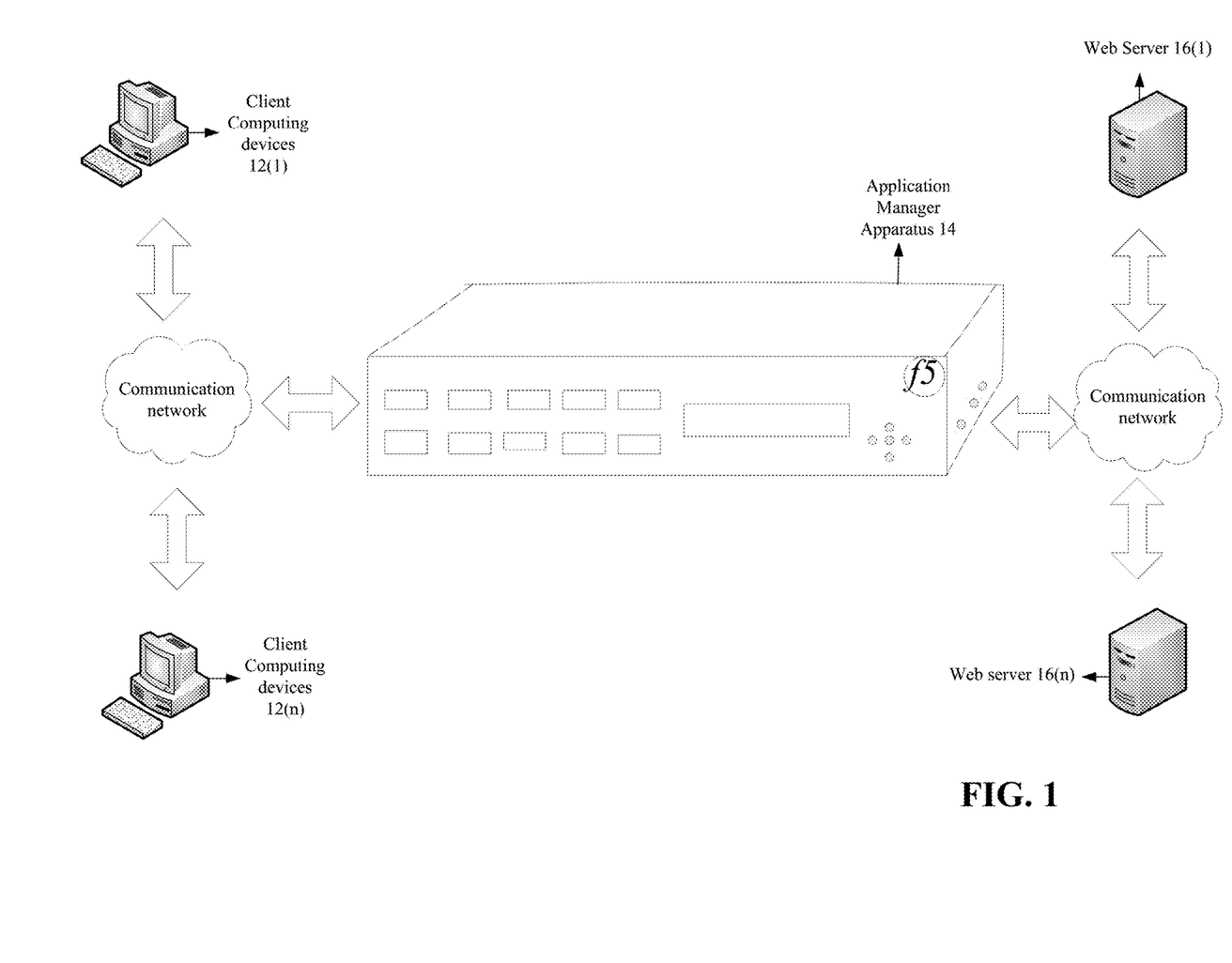
FIG. 1 is an example of a block diagram of an environment including an application manager apparatus for providing a secure network channel.
Figure 2:
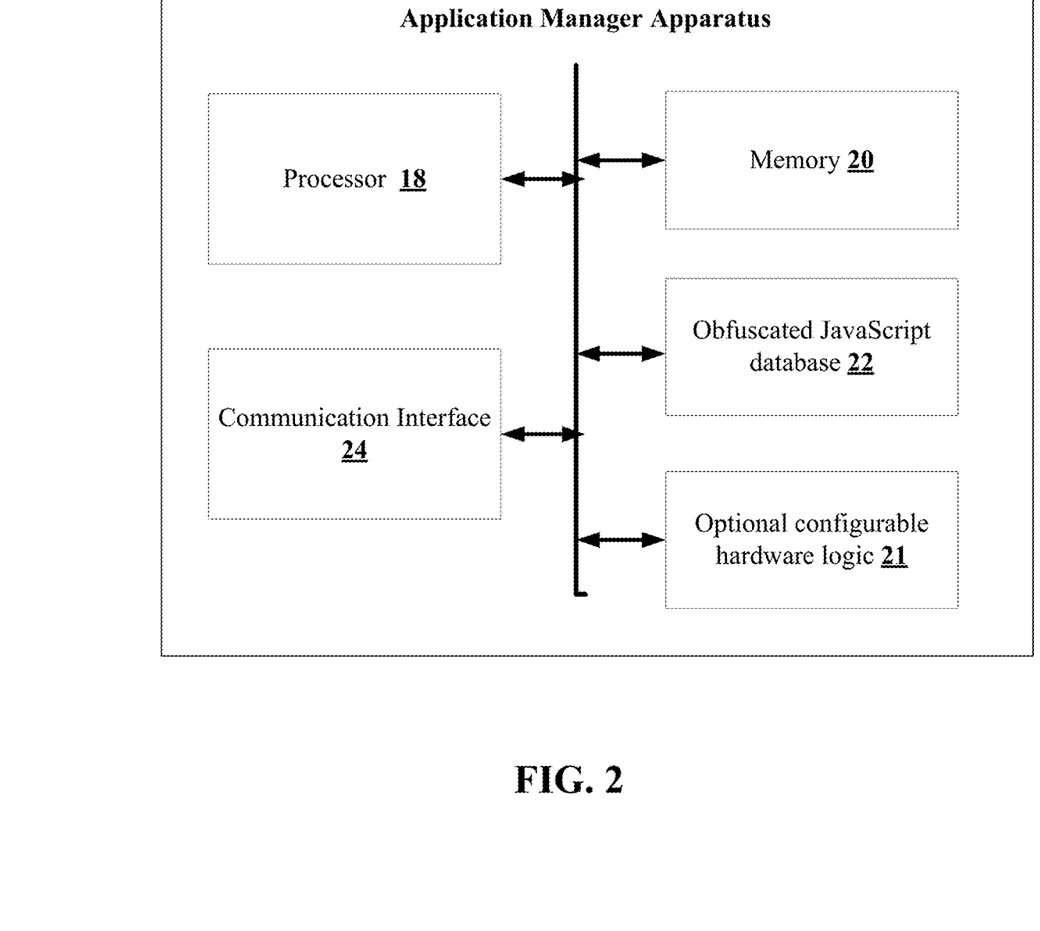
FIG. 2 is an example of a block diagram of the application manager apparatus.

An example of a network environment 10 for providing a secure network channel with the application manager apparatus 14 is illustrated in FIGS. 1 and 2. The exemplary environment 10 includes a plurality of client computing devices 12(1)-12(n), an application manager apparatus 14, and a plurality of web servers 16(1)-16(n) which are coupled together by communication networks 30, although the environment can include other types and numbers of systems, devices, components, and/or elements and in other topologies and deployments. While not shown, the exemplary environment 10 may include additional network components, such as routers, switches and other devices, which are well known to those of ordinary skill in the art and thus will not be described here. This technology provides a number of advantages including providing a secure network channel.

Referring more specifically to FIGS. 1 and 2, application manager apparatus 14 is coupled to the plurality of client computing devices 12(1)-12(n) through the communication network 30, although the plurality of client computing devices 12(1)-12(n), and application manager apparatus 14 may be coupled together via other topologies. Additionally, application manager apparatus 14 is coupled to the plurality of web servers 16(1)-16(n) through the communication network 30, although the plurality of web servers 16(1)-16(n) and application manager apparatus 14 may be coupled together via other topologies.

The application manager apparatus 14 assists with providing a secure network channel as illustrated and described by way of the examples herein, although application manager apparatus 14 may perform other types and/or numbers of functions. As illustrated in FIG. 2, the application manager apparatus 14 may include a processor or central processing unit (CPU) 18, a memory 20, optional configurable hardware logic 21, obfuscated JavaScript database 22, and a communication system 24 which are coupled together by a bus 26, although the application manager apparatus 14 may comprise other types and numbers of elements in other configurations. In this example, the bus 26 is a PCI Express bus in this example, although other bus types and links may be used.

The processor 18 within the application manager apparatus 14 may execute one or more computer-executable instructions stored in the memory 20 for the methods illustrated and described with reference to the examples herein, although the processor can execute other types and numbers of instructions and perform other types and numbers of operations. The processor 18 may comprise one or more central processing units ("CPUs") or general purpose processors with one or more processing cores, such as AMD® processor(s), although other types of processor(s) could be used (e.g., Intel®).

Memory 20 within the application manager apparatus 14 may comprise one or more tangible storage media, such as RAM, ROM, flash memory, CD-ROM, floppy disk, hard disk drive(s), solid state memory, DVD, or any other memory storage types or devices, including combinations thereof, which are known to those of ordinary skill in the art. The memory 20 may store one or more non-transitory computer-readable instructions of this technology as illustrated and described with reference to the examples herein that may be executed by the processor 18. The exemplary flowchart shown in FIG. is representative of example steps or actions of this technology that may be embodied or expressed as one or more non-transitory computer or machine readable instructions stored in memory 20 that may be executed by the processor 18 and/or may be implemented by configured logic in the optional configurable logic 21.

Figure 3:
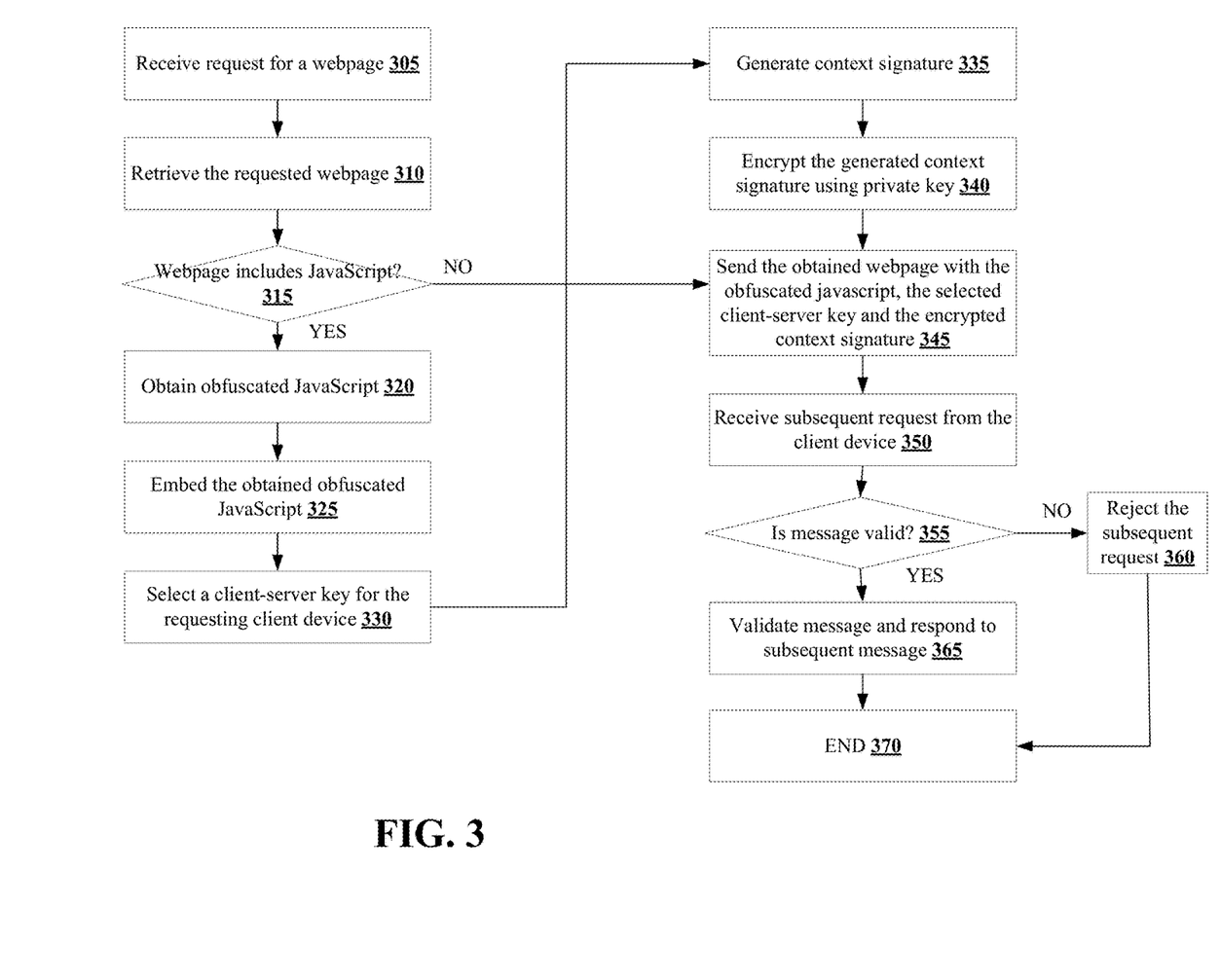
FIG. 3 is an exemplary flowchart of a method for providing a secure network channel.
Figure 4:
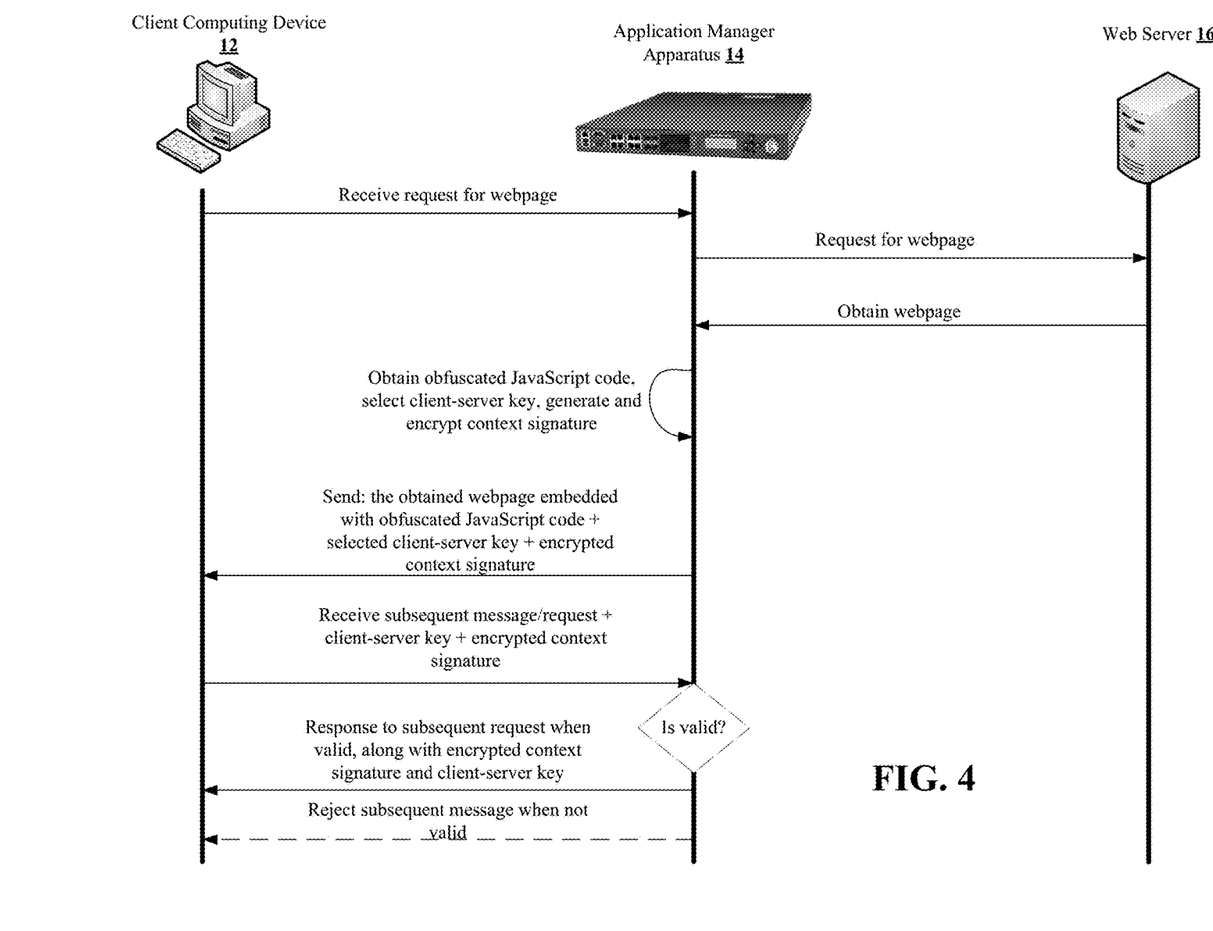
FIG. 4 is an exemplary sequence diagram illustrating the method for providing a secure network channel.

Additionally, the memory of the application manager apparatus 14 can store one or more applications that can include computer executable instructions that, when executed by the application manager apparatus 14, causes the application manager apparatus 14 to perform actions, such as to transmit, receive, or otherwise process messages, for example, and to perform other actions described and illustrated below with reference to FIGS. 3-4. The application(s) can be implemented as module or components of another application. Further, the application(s) can be implemented as operating system extensions, module, plugins, or the like. The application(s) can be implemented as module or components of another application. Further, the application(s) can be implemented as operating system extensions, module, plugins, or the like. Even further, the application(s) may be operative in a cloud-based computing environment. The application(s) can be executed within virtual machine(s) or virtual server(s) that may be managed in a cloud-based computing environment. Also, the application(s), including the application manager apparatus 14 itself, may be located in virtual server(s) running in a cloud-based computing environment rather than being tied to one or more specific physical network computing devices. Also, the application(s) may be running in one or more virtual machines (VMs) executing on the application manager apparatus 14. Additionally, in at least one of the various embodiments, virtual machine(s) running on the mobile application manager apparatus may be managed or supervised by a hypervisor.

The optional configurable hardware logic 21 in the application manager apparatus 14 may comprise specialized hardware configured to implement one or more steps of this technology as illustrated and described with reference to the examples herein. By way of example only, the optional configurable logic hardware device 21 may comprise one or more of field programmable gate arrays ("FPGAs"), field programmable logic devices ("FPLDs"), application specific integrated circuits (ASICs") and/or programmable logic units ("PLUs").

The communication system 24 in the application manager apparatus 14 is used to operatively couple and communicate between the application manager apparatus 14, the plurality of client computing devices 12(1)-12(n), and the plurality of web servers 16(1)-16(n) which are all coupled together by communication network 30 such as one or more local area networks (LAN) and/or the wide area network (WAN), although other types and numbers of communication networks or systems with other types and numbers of connections and configurations to other devices and elements. By way of example only, the communication network such as local area networks (LAN) and the wide area network (WAN) can use TCP/IP over Ethernet and industry-standard protocols, including NFS, CIFS, SOAP, XML, LDAP, and SNMP, although other types and numbers of communication networks, can be used. In this example, the bus 26 is a PCI Express bus in this example, although other bus types and links may be used.

Each of the plurality of client computing devices 12(1)-12(n), include a central processing unit (CPU) or processor, a memory, input/display device interface, configurable logic device and an input/output system or I/O system, which are coupled together by a bus or other link. The plurality of client computing devices 12(1)-12(n), in this example, may run interface applications, such as Web browsers, that may provide an interface to make requests for and send and/or receive data to and/or from the plurality of web servers 16(1)-16(n) via the application manager apparatus 14. Additionally, the plurality of client computing devices 12(1)-12(n) can include any type of computing device that can receive, render, and facilitate user interaction, such as client computers, network computer, mobile computers, virtual machines (including cloud-based computer), or the like. Each of the plurality of client computing devices 12(1)-12(n) utilizes the application manager apparatus 14 to conduct one or more operations with the plurality of web servers 16(1)-16(n), such as to obtain data from one of the plurality of web servers 16(1)-16(n), by way of example only, although other numbers and/or types of systems could be utilizing these resources and other types and numbers of functions utilizing other types of protocols could be performed.

Each of the plurality of web servers 16(1)-16(n) include a central processing unit (CPU) or processor, a memory, and a communication system, which are coupled together by a bus or other link, although other numbers and/or types of network devices could be used. Generally, the plurality of web servers 16(1)-16(n) process requests for providing access to one or more enterprise web applications received from the plurality of client computing devices 12(1)-12(n), application manager apparatus 14, via the communication network 30 according to the HTTP-based application RFC protocol or the CIFS or NFS protocol in this example, but the principles discussed herein are not limited to this example and can include other application protocols. A series of applications may run on the plurality servers 16(1)-16(n) that allows the transmission of applications requested by the plurality of client computing devices 12(1)-12(n), or the application manager apparatus 14. The plurality of web servers 16(1)-16(n) may provide data or receive data in response to requests directed toward the respective applications on the plurality of web servers 16(1)-16(n) from the plurality of client computing devices 12(1)-12(n) or the application manager apparatus 14. It is to be understood that the plurality of web servers 16(1)-16(n) may be hardware or software or may represent a system with multiple external resource servers, which may include internal or external networks. In this example the plurality of web servers 16(1)-16(n) may be any version of Microsoft® IIS servers or Apache® servers, although other types of servers may be used.

Although the plurality of web servers 16(1)-16(n) are illustrated as single web application servers, one or more actions of each of the servers 16(1)-16(n) may be distributed across one or more distinct network computing devices. Moreover, the servers 16(1)-16(n) are not limited to a particular configuration. Thus, the plurality servers 16(1)-16(n) may contain a plurality of network computing devices that operate using a master/slave approach, whereby one of the network computing devices of the servers 16(1)-16(n) operate to manage and/or otherwise coordinate operations of the other network computing devices. The plurality of web servers 16(1)-16(n) may operate as a plurality of network computing devices within cluster architecture, a peer-to peer architecture, virtual machines, or within a cloud architecture.

Thus, the technology disclosed herein is not to be construed as being limited to a single environment and other configurations and architectures are also envisaged. For example, one or more of the servers 16(1)-16(n) depicted in FIG. 1 can operate within application manager apparatus 14 rather than as a stand-alone server communicating with application manager apparatus 14 via the communication network(s) 30. In this example the servers 16(1)-16(n) operate within the memory of the application manager apparatus 14.

While application manager apparatus 14 is illustrated in this example as including a single device, application manager apparatus 14 in other examples can include a plurality of devices or blades each with one or more processors each processor with one or more processing cores that implement one or more steps of this technology. In these examples, one or more of the devices can have a dedicated communication interface or memory. Alternatively, one or more of the devices can utilize the memory, communication interface, or other hardware or software components of one or more other communicably coupled of the devices. Additionally, one or more of the devices that together comprise application manager apparatus 14 in other examples can be standalone devices or integrated with one or more other devices or applications, such as one of the plurality of web servers 16(1)-16(n) or, the application manager apparatus 14, or applications coupled to the communication network(s), for example. Moreover, one or more of the devices of application manager apparatus 14 in these examples can be in a same or a different communication network 30 including one or more public, private, or cloud networks, for example.

Although an exemplary environment 10 with the plurality of client computing devices 12(1)-12(n), the application manager apparatus 14, and the plurality of web servers 16(1)-16(n), communication networks 30 are described and illustrated herein, other types and numbers of systems, devices, blades, components, and elements in other topologies can be used. It is to be understood that the systems of the examples described herein are for exemplary purposes, as many variations of the specific hardware and software used to implement the examples are possible, as will be appreciated by those skilled in the relevant art(s).

Further, each of the systems of the examples may be conveniently implemented using one or more general purpose computer systems, microprocessors, digital signal processors, and micro-controllers, programmed according to the teachings of the examples, as described and illustrated herein, and as will be appreciated by those of ordinary skill in the art.

One or more of the components depicted in the network, such as application manager apparatus 14, plurality of client computing devices 12(1)-12(n), or plurality of web servers 16(1)-16(n), for example, may be configured to operate as virtual instances on the same physical machine. In other words, one or more of application manager apparatus 14, plurality of client computing devices 12(1)-12(n), or plurality of web servers 16(1)-16(n) illustrated in FIG. 1 may operate on the same physical device rather than as separate devices communicating through a network as depicted in FIG. 1. There may be more or fewer plurality of client computing devices 12(1)-12(n), application manager apparatus 14, or plurality of web servers 16(1)-16(n) than depicted in FIG. 1. The plurality of client computing devices 12(1)-12(n) or the plurality of web servers 16(1)-16(n) could be implemented as applications on application manager apparatus 14.

In addition, two or more computing systems or devices can be substituted for any one of the systems or devices in any example. Accordingly, principles and advantages of distributed processing, such as redundancy and replication also can be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic media, wireless traffic networks, cellular traffic networks, G3 traffic networks, Public Switched Telephone Network (PSTNs), Packet Data Networks (PDNs), the Internet, intranets, and combinations thereof.

The examples may also be embodied as a non-transitory computer readable medium having instructions stored thereon for one or more aspects of the technology as described and illustrated by way of the examples herein, which when executed by a processor (or configurable hardware), cause the processor to carry out the steps necessary to implement the methods of the examples, as described and illustrated herein.

An example of a method for providing a secure network channel will now be described with reference to FIGS. 1-4. The exemplary method begins at step 305 where the application manager apparatus 14 receives a request for a webpage from one of the plurality of client computing devices 12(1)-12(n), although the application manager apparatus 14 can receive other types or amounts of requests from other devices.

In the next step 310, the application manager apparatus 14 retrieves the requested webpage from one of the plurality of web servers 16(1)-16(n), although the application manager apparatus 14 can retrieve the requested webpage from other locations.

Next in step 315, the application manager apparatus 14 determines when the retrieved webpage includes JavaScript code. In this example, the application manager apparatus 14 scans the source code of the retrieved webpage to determine for the presence of JavaScript code, although the application manager apparatus 14 can use other techniques to determine when there is JavaScript code in the retrieved webpage. Accordingly, when the application manager apparatus 14 determines that the retrieved webpage does not include JavaScript code, then the No branch is taken to step 345 which will be further illustrated below.

However back in step 315, when the application manager apparatus 14 determines that the retrieved webpage includes JavaScript code, then the Yes branch is taken to step 320.

In step 320, the application manager apparatus 14 obtains the stored obfuscated JavaScript code from the obfuscated JavaScript database 22 by using a hash value generated using the internet protocol (IP) address of the requesting one of the plurality of client computing devices 12(1)-12(n), although the application manager apparatus 14 can obtain the obfuscated JavaScript code from other memory locations using other parameters or techniques. The application manager apparatus 14 then compares the determined hash value against all the stored hash value in the obfuscated JavaScript database 22 and obtains the obfuscated JavaScript code that is associated with the stored hash value that exactly matches the determined hash value. In this example, the application manager apparatus 14 generates and stores the obfuscated JavaScript code based on the previous requests to the webpage from the requesting one of the plurality of client computing devices 12(1)-12(n).

In the next step 325, the application manager apparatus 14 embeds the obtained stored obfuscated JavaScript code into the retrieved webpage. By embedding the obtained obfuscated JavaScript code into the retrieved webpage, the technology disclosed herein is able to prevent theft of sensitive information present in the JavaScript code and make it harder to reverse engineer the JavaScript code.

Next in step 330, the application manager apparatus 14 selects one client-server key of a plurality of client-server keys stored within the client-server key table in the memory 20 of the application manager apparatus 14, although the application manager apparatus 14 can select the one client-server key of the plurality of client-server keys from other locations. In this example, the application manager apparatus 14 selects one client-server key of a plurality of client-server keys based on the IP address of the requesting one of the plurality of client computing devices 12(1)-12(n) and the time at which the request was received for the webpage, although the application manager apparatus 14 can select one client-server key of the plurality of client server keys using other parameters. Alternatively, the application manager apparatus 14 can also select one client-server key of the plurality of client-server keys based on the obfuscation technique that was used in the obfuscated JavaScript code that is stored in the obfuscated JavaScript database 22. Additionally, each of the plurality of client-server keys in the client-server key table is associated with an index value that the application manager apparatus 14 notes while selecting one client-server key from a plurality of client-server keys.

In the next step 335, the application manager apparatus 14 generates a context signature using the IP address of the requesting one of the plurality of client computing devices 12(1)-12(n), the time at which the request for the webpage was received (timestamp) and the index of the selected client-server key, although the application manager apparatus 14 can generate the context signature using other types and/or numbers of parameters.

Next in step 340, the application manager apparatus 14 encrypts the generated context signature using a private key that is stored within the application manager apparatus 14, although the application manager apparatus 14 can encrypt the context signature using other types of keys.

In the next step 345, the application manager apparatus 14 sends the requested webpage with the embedded obfuscated JavaScript code, the selected client-server key from the plurality of client-server keys and the encrypted context signature back to the requesting one of the plurality of client computing devices 12(1)-12(n), although the application manager apparatus 14 can send other types or amounts of information to the requesting one of the plurality of client computing devices 12(1)-12(n). In this example, the requesting one of the plurality of client computing devices 12(1)-12(n) is required to encrypt the subsequent requests or messages sent to the application manager apparatus 14 using the selected client-server key. Additionally, the requesting one of the plurality of client computing devices 12(1)-12(n) is also required to send the encrypted context signature along with all the subsequent requests or messages sent to the application manager apparatus 14. Additionally in this example, the requesting one of the plurality of client computing devices 12(1)-12(n) cannot decrypt the encrypted context signature because it is does not have the necessary private or public key to decrypt the encrypted context signature. Further in this example, the requesting one of the plurality of client computing devices 12(1)-12(n) cannot decrypt the encrypted context signature using the selected client-server key. Therefore, an unauthorized user such as a hacker cannot modify the contents of the encrypted context signature.

Alternatively, the application manager apparatus 14 can simply forward the retrieved webpage to the requesting one of the plurality of client computing devices 12(1)-12(n) when the application manager apparatus 14 determines that the retrieved webpage does not include JavaScript in step 315.

Optionally in another example, the application manager apparatus 14 can only send the requested webpage back to the requesting one of the plurality of client computing devices 12(1)-12(n) when the application manager apparatus 14 initially determines that the retrieved webpage did not include the JavaScript code.

In the next step 350, the application manager apparatus 14 receives a subsequent request or a message that is encrypted using the client-server key that was sent from the requesting one of the plurality of client computing devices 12(1)-12(n). Optionally, the application manager apparatus 14 can receive the subsequent request or message that is either not encrypted or encrypted using a different key. Additionally, the application manager apparatus 14 also receives the client-server key and the encrypted context signature from the requesting one of the plurality of client computing devices 12(1)-12(n), although the application manager apparatus 14 may not receive the client-server key in another example. By way of example only, the subsequent request or a message can be a request for another webpage or a notification message that was generated and sent due to the execution of the obfuscated JavaScript on the browser of the requesting one of the plurality of client computing devices 12(1)-12(n), although the received subsequent message can include other types or amounts of information.

Next in step 355, the application manager apparatus 14 determines when the received subsequent message or request is valid. In this example, the application manager apparatus 14 determines for the validity of the received subsequent message or request by first decrypting the encrypted context signature information that was received as part of the subsequent message or request using the private key stored within the application manager apparatus 14. Then the application manager apparatus 14 compares the IP address that is present in the decrypted context signature against the IP address of the requesting one of the plurality of client computing devices 12(1)-12(n) that sent the subsequent request or message. Additionally, the application manager apparatus 14 determines when the timestamp within the decrypted context signature has expired. Furthermore, the application manager computing device also obtains one of the client-server key from a plurality of client-server keys using the index information in the decrypted context signature. Accordingly, the application manager apparatus 14 determines that the received subsequent request or message is valid when: the IP address that is present in the decrypted context signature matches with the IP address of the requesting one of the plurality of client computing devices that sent the subsequent message or response; the timestamp information within the decrypted context signature has not expired; and when the client-server key that was obtained using the index information in the decrypted context signature exactly matches with the received client-server key, although other types and/or numbers of validation factors could be used. In this example, when one of the above illustrated parameters does not match or has expired, then the application manager apparatus 14 determines that either a hacker has extracted the cryptographic key and used it to fake messages, or a malware has been injected into the web browser of the requesting one of the plurality of client computing devices 12(1)-12(n) or the hacker is replaying messages to generate a distributed denial of service attack. Accordingly, when the application manager apparatus 14 determines that the received subsequent message or response is not valid, then the No branch is taken to step 360.

In step 360, the application manager apparatus 14 rejects the subsequent request or message and ends the exemplary method in step 370.

However if back in step 355, when the application manager apparatus 14 determines that the received subsequent message is valid, then the Yes branch is taken to the next step 365. In step 365, the application manager apparatus 14 validates the received subsequent message or response from the requesting one of the plurality of client computing devices 12(1)-12(n) and responds to the subsequent message or request and the exemplary method ends at step 370. In this example, the application manager apparatus 14 again sends the encrypted context information and the selected client-server key along with the response to the received subsequent message or request as illustrated above.

Having thus described the basic concept of the technology, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the technology. Additionally, the recited order of processing elements or sequences, or the use of numbers, letters, or other designations therefore, is not intended to limit the claimed processes to any order except as may be specified in the claims. Accordingly, the technology is limited only by the following claims and equivalents thereto.

What is claimed is:

1. A method for providing a secure channel implemented by a network traffic management system comprising one or more network traffic management devices, client devices, or server devices, the method comprising:
   selecting a client-server key from a plurality of client-server keys based on an IP address of a client and a time of receiving a request from the client, the selecting further comprising identifying an index value associated with the selected client-server key;
   generating a context signature based on the IP address of the client, the time of receiving the request from the client and the index value associated with the selected client-server key;
   encrypting the generated context signature using a stored private key;
   providing a secure channel by preparing and sending a response comprising the selected client-server key and the encrypted context signature back to the client;
   receiving a subsequent request, the sent encrypted context signature and the sent client-server key from the client;
   determining when the received subsequent request is valid based on the received encrypted context signature and the received client-server key; and
   preparing and sending a subsequent response to the subsequent request when the subsequent request is determined to be valid.

2. The method as set forth in claim 1 wherein the determining further comprises:
   decrypting the received encrypted context signature using a stored private key;
   comparing a stored IP address within the decrypted context signature with the IP address of the client that sent the subsequent request to determine when the stored IP address is equal to the IP address of the client that sent the subsequent request;
   determining when timestamp information within the decrypted context signature has not expired; and
   obtaining a stored client-server key based on the index value associated with the selected client-server key and comparing the obtained stored client-server key and the received client-server key to determine when the obtained stored client-server key is equal to the received client-server key.

3. The method as set forth in claim 2 further comprising determining the received subsequent request to be valid when the stored IP address is determined to be equal to the IP address of the client that sent the subsequent request, when the timestamp information within the decrypted context signature is determined not to be expired and when the obtained stored client-server key is determined to be equal to the received client-server key.

4. The method as set forth in claim 1 further comprising rejecting the received subsequent request when the received subsequent is not determined to be valid.

5. The method as set forth in claim 1 wherein the providing further comprises:

obtaining a stored obfuscated JavaScript code based on the IP address of the client;

embedding the obtained obfuscated JavaScript code in the response; and providing the secure channel by sending the response embedded with the obfuscated JavaScript code.

6. A non-transitory computer readable medium having stored thereon instructions for providing a secure channel comprising machine executable code which when executed by at least one processor, causes the processor to:

select a client-server key from a plurality of client-server keys based on an IP address of a client and a time of receiving a request from the client, the selecting further comprising identifying an index value associated with the selected client-server key;

generate a context signature based on the IP address of the client, the time of receiving the request from the client and the index value associated with the selected client-server key;

encrypt the generated context signature using a stored private key;

provide a secure channel by preparing and sending a response comprising the selected client-server key and the encrypted context signature back to the client;

receive a subsequent request, the sent encrypted context signature and the sent client-server key from the client;

determine when the received subsequent request is valid based on the received encrypted context signature and the received client-server key; and prepare and send a subsequent response to the subsequent request when the subsequent request is determined to be valid.

7. The medium as set forth in claim 6 wherein the determining further comprises:

decrypt the received encrypted context signature using a stored private key;

compare a stored IP address within the decrypted context signature with the IP address of the client that sent the subsequent request to determine when the stored IP address is equal to the IP address of the client that sent the subsequent request;

determine when timestamp information within the decrypted context signature has not expired; and obtain a stored client-server key based on the index value associated with the selected client-server key and comparing the obtained stored client-server key and the received client-server key to determine when the obtained stored client-server key is equal to the received client-server key.

8. The medium as set forth in claim 7 further comprising determine the received subsequent request to be valid when the stored IP address is determined to be equal to the IP address of the client that sent the subsequent request, when the timestamp information within the decrypted context signature is determined not to be expired and when the obtained stored client-server key is determined to be equal to the received client-server key.

9. The medium as set forth in claim 6 further comprising reject the received subsequent request when the received subsequent is not determined to be valid.

10. The medium as set forth in claim 6 wherein the providing further comprises:

obtain a stored obfuscated JavaScript code based on the IP address of the client;

embed the obtained obfuscated JavaScript code in the response; and provide the secure channel by sending the response embedded with the obfuscated JavaScript code.

11. A network traffic manager apparatus comprising memory comprising programmed instructions stored in the memory and one or more processors configured to be capable of executing the programmed instructions stored in the memory to:

select a client-server key from a plurality of client-server keys based on an IP address of a client and a time of receiving a request from the client, the selecting further comprising identifying an index value associated with the selected client-server key;

generate a context signature based on the IP address of the client, the time of receiving the request from the client and the index value associated with the selected client-server key;

encrypt the generated context signature using a stored private key;

provide a secure channel by preparing and sending a response comprising the selected client-server key and the encrypted context signature back to the client; and receive a subsequent request, the sent encrypted context signature and the sent client-server key from the client;

determine when the received subsequent request is valid based on the received encrypted context signature and the received client-server key; and prepare and send a subsequent response to the subsequent request when the subsequent request is determined to be valid.

12. The network traffic manager apparatus as set forth in claim 11 wherein the one or more processors are further configured to be capable of executing the programmed instructions stored in the memory to:

decrypt the received encrypted context signature using a stored private key;

compare a stored IP address within the decrypted context signature with the IP address of the client that sent the subsequent request to determine when the stored IP address is equal to the IP address of the client that sent the subsequent request;

determine when timestamp information within the decrypted context signature has not expired; and obtain a stored client-server key based on the index value associated with the selected client-server key and comparing the obtained stored client-server key and the received client-server key to determine when the obtained stored client-server key is equal to the received client-server key.

13. The network traffic manager apparatus as set forth in claim 12 wherein the one or more processors are further configured to be capable of executing the programmed instructions stored in the memory to determine the received subsequent request to be valid when the stored IP address is determined to be equal to the IP address of the client that sent the subsequent request, when the timestamp information within the decrypted context signature is determined not to be expired and when the obtained stored client-server key is determined to be equal to the received client-server key.

14. The network traffic manager apparatus as set forth in claim 11 wherein the one or more processors are further configured to be capable of executing the programmed instructions stored in the memory to reject the received subsequent request when the received subsequent is not determined to be valid.

15. The network traffic manager apparatus as set forth in claim 11 wherein the one or more processors are further configured to be capable of executing the programmed instructions stored in the memory to the providing further comprises:

obtain a stored obfuscated JavaScript code based on the IP address of the client;

embed the obtained obfuscated JavaScript code in the response; and     provide the secure channel by sending the response embedded with the obfuscated JavaScript code.

16. A network traffic management system, comprising one or more traffic management apparatuses, client devices, or server devices, the network traffic management system comprising memory comprising programmed instructions stored thereon and one or more processors configured to be capable of executing the stored programmed instructions to:

select a client-server key from a plurality of client-server keys based on an IP address of a client and a time of receiving a request from the client, the selecting further comprising identifying an index value associated with the selected client-server key;

generate a context signature based on the IP address of the client, the time of receiving the request from the client and the index value associated with the selected client-server key;

encrypt the generated context signature using a stored private key;

provide a secure channel by preparing and sending a response comprising the selected client-server key and the encrypted context signature back to the client;

receive a subsequent request, the sent encrypted context signature and the sent client-server key from the client;

determine when the received subsequent request is valid based on the received encrypted context signature and the received client-server key; and     prepare and send a subsequent response to the subsequent request when the subsequent request is determined to be valid.

\* \* \* \* \*